United States Patent [19]

Masi et al.

[11] Patent Number: 5,189,000

[45] Date of Patent: Feb. 23, 1993

[54] SUPPORTED CATALYST FOR THE POLYMERIZATION AND COPOLYMERIZATION OF OLEFINICALLY UNSATURATED COMPOUNDS, AND A (CO)POLYMERIZATION PROCESS WHICH USES IT

[75] Inventors: Francesco Masi, San Donato Milanese; Renzo Invernizzi; Antonio Carbonaro, both of Milan; Lorenzo Costa, Sommo; Angelo Moalli, Castelletto Ticino, all of Italy

[73] Assignees: Montedipe S.r.l.; Enichem S.p.A., Milan, Italy

[21] Appl. No.: 673,272

[22] Filed: Mar. 21, 1991

[30] Foreign Application Priority Data

Mar. 26, 1990 [IT] Italy ............................. 19816 A/90

[51] Int. Cl.$^5$ .................................................. C08F 4/64
[52] U.S. Cl. ..................................... 502/113; 502/103; 502/117; 502/120
[58] Field of Search ................. 502/103, 113, 117, 120

[56] References Cited

U.S. PATENT DOCUMENTS 4,849,390  7/1989  Sano et al. ........................... 502/113

FOREIGN PATENT DOCUMENTS 0043220   1/1982  European Pat. Off. .
0065700  12/1982  European Pat. Off. .
0264090   4/1988  European Pat. Off. .
2382465   9/1978  France .

Primary Examiner—Patrick P. Garvin
Assistant Examiner—Brent M. Peebles
Attorney, Agent, or Firm—Shea & Gould

[57] ABSTRACT

A supported catalyst for the polymerization and copolymerization of olefinically unsaturated compounds is described, comprising an organometallic compound of aluminium and a second component obtained by bringing a titanium, vanadium or chromium compound, at least one compound of a second metal chosen from V, Al, Zr, Hf, Mo and Nd and optionally a magnesium compound into contact with a porous support consisting of microbeads of aerogels of one or more inorganic oxides distinguished by low density, high porosity and the fact that at least 90% of the pores have a diameter lying within a very narrow range of values. The process for the polymerization or copolymerization of olefinically unsaturated compounds based on the use of said catalyst is also described.

4 Claims, No Drawings

SUPPORTED CATALYST FOR THE POLYMERIZATION AND COPOLYMERIZATION OF OLEFINICALLY UNSATURATED COMPOUNDS, AND A (CO)POLYMERIZATION PROCESS WHICH USES IT

This invention relates to a supported catalyst for the (co)polymerization of olefinically unsaturated compounds, and the polymerization process using said catalyst. More particularly, the present invention relates to a supported catalyst, active in the polymerization of olefinically unsaturated compounds, especially ethylene, or in the copolymerization of ethylene with alpha-olefins, comprising an organometallic derivative of aluminium and a second component obtained by reacting a titanium, vanadium or chromium compound, at least one compound of a second metal chosen from Al, V, Zr and Hf, Nd, Mo and optionally a magnesium compound in the presence of a porous support in the form of microbeads of aerogels of one or more inorganic oxides distinguished by low density, high porosity and the fact that at least 90% of their pores have a diameter within a very narrow range of values (the difference between the minimum value and the maximum value never exceeding 50 Å) It is known that ethylene or general alpha-olefins can be polymerized by the low pressure process over Ziegler-Natta catalysts. These catalysts are generally formed from a compound of group III to group VI elements of the periodic table (transition metal compounds) mixed with an organometallic compound or hydride of group I to group III elements of the periodic table. The known art comprises Ziegler-Natta catalysts in which the transition metal compound is fixed to a solid support, such as a magnesium halide. For example, U.S. Pat. No. 4,296,223 describes a solid catalyst component obtained by interacting magnesium dichloride, a titanium alcoholate and an aluminium chloride, and U.S. Pat. No. 4,192,772 describes a solid catalyst component obtained by interacting a magnesium compound, a titanium compound, a zirconium compound and an aluminium halide.

These catalysts normally allow olefinic polymers to be obtained with a narrow and wide molecular weight distribution respectively, but do not enable the polymer to be obtained directly in the form of flowable granules. Solid catalyst components are also known in the art obtained by activating with an aluminium halide a complex containing magnesium and titanium compounds in the form of halides or alcoholates and an electron donor. Such a complex can be deposited on a support, particularly a porous support, and then activated to provide solid catalyst components particularly suitable for the polymerization or copolymerization of ethylene in the gaseous phase (see for example U.S. Pat. Nos. 4,359,561, 4,370,456 or 4,379,758).

It is also known to be able to use aerogel-based supports for catalysts.

For example, the article in "Advances in Colloid and Interface Science", 5 (1976), pages 245-273 describes general method for preparing aerogels of $SiO_2$, $Al_2O_3$, MgO and others by hydrolysis and polycondensation of the alcoholate of the metal concerned, followed by drying under supercritical conditions. However in this method it is not possible to control the particle size distribution of the spherical particles or obtain a large percentage of pores with a diameter variable within a narrow range.

European patent 213,987 relates to catalyst supports consisting of spheroidal silica particles obtained by granulating a $SiO_2$ hydrosol with an $SiO_2$ aerogel and drying. The product obtained in this manner has a surface area which never exceeds 500 $m^2/g$. U.S. Pat. No. 4,246,137 describes a method for preparing silica-zirconia xerogels and their use in preparing catalysts for olefin polymerization, the method comprising reacting a zirconium compound with an alkaline metal silicate, then ageing the hydrogel obtained, washing it and finally calcining it. The product obtained has a total pore volume of between 1.5 and 3.5 ml/g, a surface area of between 200 and 600 $m^2/g$, but a pore diameter extending within the range of 200-600 Å.

The supported catalysts of the known art enable polyethylenes to be obtained in flowable granular form, however problems often arise deriving from the poor rheology of the polymer because of the presence of fines, and the friability of the granules. A further problem is the unsatisfactory productivity in terms of the quantity of polymer obtained per unit weight of catalyst. This probably derives from the difficulty of depositing the catalyst components on the support in highly active form. Finally, known catalysts are generally insufficiently flexible for use in the production of olefinic polymers with differing characteristics according to requirements.

According to the present invention, the applicant has found that it is possible to obtain an active catalyst component and consequently a catalyst highly effective in the polymerization or copolymerization of olefinically unsaturated compounds without any of the aforesaid drawbacks, by using in the known methods for preparing such an active component a porous support consisting of microbeads of aerogels of inorganic oxides, characterised in that at least 90% of their pores have substantially the same diameter, said diameter lying within a very narrow range of values, the difference between the maximum and minimum values of which never exceeds 50 Å.

The present invention therefore firstly provides a supported catalyst for the polymerization and copolymerization of olefins, comprising an organometallic derivative of aluminium and a second component obtained by bringing a magnesium compound and/or a titanium, vanadium or chromium compound and possibly at least one compound of a second metal chosen from V, Al, Zr, Mo, Nd and Hf, into contact with a porous support in the form of microbeads of aerogels of one or more inorganic oxides, characterised by a surface area exceeding 300 $m^2/g$, a total pore volume exceeding 1 ml/g and the fact that at least 90% of their pores have a diameter lying within a very narrow range of values, the difference between the maximum and minimum values of which never exceeds 50 Å, said diameter being between 50 and 1000 Å. It should be noted that the said surface area can undergo a contraction after formation of the catalyst.

The organometallic aluminium compound is conveniently chosen from alkylaluminiums, alkylaluminium hydrides, bis-dialkylaluminium sulphates and alkylaluminium halides containing up to 8 carbon atoms. Trialkylaluminiums with from 2 to 4 carbon atoms in the alkyl radical are preferred, such as triethylaluminium, tributylaluminium and triisobutylaluminium, and also in mixture with dialkylaluminium chlorides. The said solid support thus consists of microbeads of an aerogel, the main characteristic of which is the very narrow pore diameter distribution. Such an aerogel can comprise one or more inorganic oxides and is prepared by the following basic operations:

a) preparing a colloidal solution (sol) of an oxide of an aforesaid metal or a mixture of oxides, by hydrolysing an alkoxide or a mixture of alkoxides in the presence of a catalyst and a substance which favours the desired uniform porosity of the subsequent gel (as specified hereinafter); one or more alkoxides can also be prepared in situ;

b) transforming the thus prepared colloidal solution into droplets of the desired diameter, and dispersing them in a medium immiscible with the sol;

c) transforming the sol droplets into gel particles;

d) washing the gel particles with a suitable solvent;

e) drying the particles under hypercritical conditions.

The powder obtained can be finally calcined to eliminate and organic substances still present or to give it particular characteristics.

The colloidal solution of a) is prepared by mixing at least one alkoxide with water; water is immiscible with the alkoxide, but the hydrolysis products are soluble in water, which is the reason why the solution is clear on completion of the hydrolysis of the alkoxide (i).

To prepare the sol concerned, alkoxides of metals pertaining to one of Groups II to VI of the periodic table or to Group VII B or to Group VIII can be used, of particular interest being the alkoxides of Al, Si, Ti, B, La, Zr, Hf, Cr, Sn and Mg. As stated, powders of a single oxide or of mixed oxides can be prepared, in this latter case the hydrolysis of point a) being based on a suitable mixture of alkoxides.

The hydrolysis is conducted in the presence of a catalyst consisting of an acid, a base or an inorganic salt. By suitable adjusting the water/alkoxide ratio, the pH and/or the temperature of the system the hydrolysis kinetics can be controlled, as can the particle dimensions or pore diameter. If preparing a mixed oxide the second component can also be added as salt (preferably chloride) to the already partly hydrolyzed alkoxide of the first component. In this manner a polycondensation product is obtained in which the two metals are uniformly dispersed and connected by oxygen bridges.

The characteristics of the colloidal solution following hydrolysis and partial polycondensation of the alkoxide can further be adjusted by removing part of the solvent, consisting of excess water and the formed alcohol, for example by low temperature evaporation.

Modifications can also be made by adding substances able to coordinate with the inorganic polymer, such as glycols, dimethylformamide and organic acids. In addition to dimethylformamide, ethylene glycol and oxalic acid are of interest.

The colloidal solution prepared under a) is then transformed into sol droplets of the required size, in relation to the expedients followed in the preliminary hydrolysis step. The operation under b) can be conducted by conventional techniques, such as mechanical agitation or spray drying. The sol droplets produced by one of these techniques are then transformed into gel microbeads. This transformation can happen directly as a result of the polycondensation reaction, or can be suitably accelerated by eliminating a part of the solvent or by ion exchange.

The gel particles are finally washed and then dried under hypercritical conditions, preferably in the presence of a medium chosen from methyl alcohol, ethyl alcohol and carbon dioxide. Of all the possible aerogels it is particularly convenient according to the present invention to use $SiO_2$ microbeads with a surface area (BET) exceeding 300 $m^2/g$ and a total pore volume exceeding 1.97 ml/g, in which 95% of their pores have a diameter between 100 and 150 Å.

As stated, the active component of the catalytic system of the present invention, characterised by the presence of the aforesaid aerogel, is obtained by any one of the methods well known to every expert of the art, by simply using the aerogel during the preparation of the catalyst.

Some methods for preparing the catalyst of the present invention are described hereinafter by way of example, it being however to be noted that any other catalyst or method for its preparation implicating the presence or use of an aerogel of the stated type fall within the scope of the present invention.

The active component of the catalyst, by which is meant the component containing the transition metal according to the present invention, can thus originate as the product of the reaction between a compound of elements of Groups III to VIII of the periodic table and a support material formed from a mixture of an aerogel taken from those previously mentioned and the product in the form of solid particles obtained by spray-drying a solution of magnesium chloride in ethanol, with an alkoxide content of at least 1.5% by weight and presenting under X-ray examination a spectrum without the characteristic peaks of crystalline magnesium chloride and a maximum peak at about 10.8 Å.

Alternatively, the magnesium chloride particles are reacted with the transition metal compound (such as butoxtitanium) in the presence of an organic solvent (such as butyl alcohol+hydrocarbon solvent) and the aerogel added to the mixture obtained, followed by the alkylaluminium of interest. A catalyst active in olefin polymerization, and particularly aimed at producing polymers with a wide molecular weight distribution, can consist of a trialkylaluminium and a solid catalytic component obtained by reacting an alkylaluminium halide with the product of the reaction between hafnium halide, silicon alcoholate, magnesium halide, alcohol and titanium alcoholate, the reaction being effected in the presence of an aerogel. The reaction conditions and the operating parameters are those reported in European Patents No. 65700, 146507, 281524, the relevant parts of which can act as a reference for the present description.

A catalyst highly active in the preparation of low or medium density linear polyethylene can be prepared by operating for example at high pressure in a tubular reactor in accordance with the teachings of European Patent No. 243 327, in which the active component is obtained by reacting a mixture of aerogel and magnesium chloride prepared by spray-drying its ethanolic solution, with titanium tetrachloride and an alcohol, and reacting the product with an alkylaluminium halide.

The active component of the catalytic system according to the present invention can also be prepared by impregnating the aforedescribed solid support with a solution of magnesium chloride and titanium alcoholate, evaporating the solvent and then impregnating the product with a solution of magnesium chloride in ester.

Again, the result of the first impregnation can be reacted with a solution containing in addition to the magnesium chloride and the titanium alcoholate a zirconium and/or hafnium compound, in relation to the type of polymerization to be implemented or the type of polymer to be obtained.

The active component of the catalytic system according to the present invention can also be prepared by impregnating the aerogel with alkyl magnesium followed by reaction with alkylaluminium chlorides. To this support are then successively added titanium tetrachloride and/or vanadium tetrachloride, and compounds of vanadium or chromium in a reduced state of oxidation, such as vanadium bis-arenes (or chromium bis-arenes), to obtain (by symproportionation) vanadium-based bimetal or monometal catalytic systems. From this aspect it may be of interest to refer to some paragraphs of European Application Publ. No. 358 265.

The active component of the catalytic system by symproportionation of $TiCl_4$ and/or $VCl_4$ with vanadium bis-arenes or chromium bis-arenes can also be prepared in the presence of the aerogels but in the absence of magnesium compounds, to thus obtain catalytic systems particularly suitable for the homo and copolymerization of olefins at high temperature, such as processes in solution and the already mentioned tubular process, or for the production of ethylene copolymers with random distribution of the alpha-olefin used.

As already stated the catalysts of the present invention are active in ethylene polymerization, in the copolymerization of ethylene with alpha-olefins, and in olefin polymerization and copolymerization. Thus high density ethylene polymers can be prepared (density from about 0.96 to about 0.95 g/ml) with a molecular weight distribution ranging from narrow to wide (Mw/Mn from about 4 to more than 14). The catalysts are also active towards alpha-olefinic comonomers and enable copolymers of ethylene with an alpha-olefin to be prepared having from medium to low density (density from about 0.94 to about 0.92 g/ml). Alpha-olefins suitable for this purpose are those containing from 3 to 10 carbon atoms and preferably from 4 to 8 carbon atoms, such as propylene, 1-butene, 1-hexene, 1-octene and 4-methyl-1-pentene. Copolymers of ethylene with diolefins (conjugated or not) can also be prepared with these catalysts (particularly those based on Ti-V and V).

Conjugated diolefins suitable for the purpose are those containing from 4 to 10 carbon atoms such as 1,3-butadiene, 1,3-isoprene. Among the non-conjugated can be mentioned 1,5-hexadiene, 1,6-heptadiene, 1,8-nonadiene.

The catalysts are also sensitive to hydrogen, so allowing easy molecular weight adjustment (melt flow index at 2.16 kg from about 0.0 to more than 50 g/10 min).

The catalysts of the present invention can be used in polymerization by the method of suspension in an inert diluent, or by the gaseous phase, fluidized bed or agitated method. The general polymerization conditions are: temperature between 50° and 110° C., total pressure between 5 and 40 bar, and a ratio of hydrogen partial pressure to ethylene partial pressure of between 0 and 10. In all cases a high olefinic polymer productivity is obtained (productivity of the order of 2-10 kg of polymer per gram of solid catalyst component), the polymer obtained having an excellent rheology and in particular being in the form of non-friable granules (with a size generally of the order of 800–1500 μm), non-friable and free of fines.

The following experimetal examples are provided to better illustrate the present invention. In these examples the support for the solid catalyst component is a silica aerogel with the following characteristics:

surface area (BET); 307 m$^2$/g
total pore volume; 1.97 ml/g
95% of pore diameters; 100–150 Å.

The silica can be used either as such or previously activated, for example by heating under vacuum for 8 hours at 165° C. Subsequent cooling is carried out in a nitrogen atmosphere.

EXAMPLE 1

The following are fed in the stated order into a 3-neck 500 ml flask fitted with a bladed stirrer, under a head of nitrogen:
50 cm$^3$ of n-heptane
0.5 g of spray-dried $MgCl_2$ support with an ethanol residue of 28 wt % [0.39 g $MgCl_2$ (4.1 mmoles)+0.11 g $C_2H_5OH$ (2.4 mmoles)]
1.4 g (4.1 mmoles) of $Ti(OC_4H_9)_4$, Mg/Ti molar ratio=1
0.30 g (4.1 mmoles) of anhydrous butyl alcohol $MgCl_2$/butanol molar ratio=1.

The mixture is heated to 80° C. under pressure for 1 hour until the spray-dried $MgCl_2$ has completely dissolved, to obtain a clear solution in heptane.

This is cooled to ambient temperature and 5 g of the aforestated silica aerogel added. The mixture is heated to 60° C. for 1 hour, checking the metal adsorption onto the aerogel by analyzing the Mg and Ti in the n-$C_7$ after cooling.

The next step is commenced when the metal content of the heptane is less than 5% of the initial value.

Chlorination with $Al(C_2H_5)_2Cl$ is then commenced. 2.1 g of $Al(C_2H_5)_2Cl$ (17.1 mmoles) diluted in 5 g of n-heptane [ratio of chlorine in the diethylaluminium-chloride to alkoxy groups (OEt+OBu)=0.75:1] are added dropwise at ambient temperature to the flask under stirring. When the addition is complete the mixture is heated to 60° C. for 30 minutes and the solid filtered through a sintered glass plate, washing it with 5 portions each of 30 ml of n-heptane.

The solid catalyst has the following characteristics:
particle shape and size similar to those of the aerogel;
  mean diameter 100μ
apparent density 0.40 g/cm$^3$
surface area 160 m$^2$/g
total pore volume 1.0 cc/g
titanium content 3.1% expressed as metal
$Ti^{+3}/Ti^{+4}$ molar ratio 0.84/1.
  The solid contains:
  Ti=3.0 wt %
  Mg=1.45 wt %
  Cl=8.94 wt %
  Al=1.70 wt %
  Organic fraction=8.2 wt %
  Aerogel=76.7 wt %
  $Ti_1Mg_{0.96}Cl_{4.6}Al_{1.0}(OEt+OBu+Et)_{2.2}$.

EXAMPLE 2

Ethylene polymerization with $SiO_2$/MgTi prepared as in Example 1. 1820 ml of anhydrous n-heptane, 0.68 g of triethylaluminium and 133 mg of the solid catalyst component prepared as previously described are introduced in that order into a 5 liter reactor, under stirring. The temperature in the reactor is raised to 90° C. and the reactor pressurized with hydrogen to 4 atm. Ethylene is fed to a pressure of 9 atm and this pressure is maintained during the following 4 hours by continuously feeding ethylene. At the end of this time period the polymerization is interrupted by introducing into the reactor 20 ml of a 10 wt % solution of ionol in alcohol. In this manner 590 g of polyethylene are obtained. The polyethylene production characteristics are as follows:

productivity: 4.5 kg of polyethylene per g of solid catalyst component;

yield: 147 kg of polyethylene per g of titanium in the solid catalyst component.

The polyethylene produced has the following characteristics:

Melt index: ASTM-D 1230, 8 g/10 min
Shear sensitivity: ASTM-D 1238, 26.5
Ratio of weight-average molecular weight to number-average molecular weight Mw/Mn: 3.9
Density: ASTM-D 2839, 0.9635 g/ml
Physical form of polymer: runnable spherules with a mean diameter of $1100\mu$ ($>60$ wt %)
Apparent density: 0.31 g/ml
Fines content ($<150\mu$): 0.3 wt %
Fraction extractable with boiling n-heptane: 2.8% in weight.

EXAMPLE 3

Polymerization of ethylene and 1-butene with $SiO_2/MgTi$ prepared as in Example 1

1820 ml of anhydrous n-heptane, 0.68 g of triethylaluminium, 6 g of 1-butene and 130 mg of the solid catalyst component prepared as previously described are introduced in that order into a 5 liter reactor, under stirring.

The temperature in the reactor is raised to 85° C. and the reactor pressurized with hydrogen to 3.5 atm. Ethylene is fed to a pressure of 9 atm and this pressure is maintained during the following 4 hours by continuously feeding ethylene. At the end of this time period the polymerization is interrupted by introducing into the reactor 20 ml of a 10 wt % solution of ionol in alcohol, 500 g of copolymer are obtained.

Productivity: 3.8 kg of polyethylene per g of solid catalyst component;

Yield: 125 kg of polyethylene per g of titanium in the solid catalyst component.

The copolymer produced has the following characteristics:

Melt index: ASTM-D 1230, 4.5 g/10 min
Shear sensitivity: ASTM-D 1238, 27.5
Ratio of weight-average molecular weight to number-average molecular weight Mw/Mn: 4.3
Density: ASTM-D 2839, 0.9535 g/ml
Physical form of polymer: runnable spherules with a mean diameter of $1000\mu$
Apparent density: 0.30 g/ml
Fines content ($<150\mu$): 0.4 wt %
Fraction extractable with boiling n-heptane: 2 wt %.

EXAMPLE 4

The following are fed in the stated order into a 3-neck 500 ml flask fitted with a bladed stirrer, under nitrogen:
50 ml of n-heptane
0.5 g of spray-dried $MgCl_2$ with an ethanol residue of 28 wt % [0.39 g $MgCl_2$ (4.1 mmoles) + 0.11 g $C_2H_5OH$ (2.4 mmoles)]
0.7 g (2.05 mmoles) of $Ti(OC_4H_9)_4$, Mg/Ti molar ratio = 2
1.44 g (3.07 mmoles) of $Hf(OC_4H_9)_4$, Hf/Ti molar ratio = 1.5
0.23 g (3.07 mmoles) of butyl alcohol The mixture is heated to 80° C. under pressure for 1 hour until complete dissolution, to obtain a clear hydrocarbon solution. This is cooled to ambient temperature and 5 g of the aforestated aerogel activated as already described are added. The mixture is heated to 60° C. for 1 hour, checking the metal adsorption onto the aerogel by analyzing the Mg, Ti and Hf in the heptane after cooling. The next step is commenced when the metal content of the solution is less than 10 mol %.

Chlorination with ethylaluminium sesquichloride is then commenced. 6.42 g (26 mmoles) of EASC are added dropwise under stirring (ratio chlorine/total OR = 3). When the addition is complete the mixture is heated to 80° C. for 120 minutes.

The mixture is cooled, the solid filtered and washed, etc.

The solid catalyst has the following characteristics:
particle shape and size similar to those of the aerogel;
mean diameter $100\mu$
apparent density 0.44 g/cm$^3$
surface area 140 m$^2$/g
total pore volume 0.95 cc/g
titanium content 1.32 wt %
$Ti^{+3}/Ti^{+4}$ ratio 0.7/1.
The solid contains:
Ti = 1.32 wt %
Mg = 1.32 wt %
Hf = 6.4 wt %
Al = 1.16 wt %
Chlorine = 14.7 wt %
Organic fraction = 6.6 wt %
Aerogel = 68.5 wt %
$Ti_1Mg_2Hf_{1.3}Al_{3.2}Cl_{15}(OEt+OBu+Et)_{6.8}$.

EXAMPLE 5

Polymerization of ethylene and 1-butene with $SiO_2/Mg/Ti/Hf$ 1820 ml of anhydrous n-heptane, 0.34 g of triisobutylaluminium, 6 g of 1-butene and 1.77 mg of the solid catalyst component prepared as previously described are introduced in that order into a 5 liter reactor, under stirring.

The temperature in the reactor is raised to 85° C. and the reactor pressurized with hydrogen to 4.2 atm. Ethylene is fed to a pressure of 10 atm and this pressure is maintained during the following 4 hours by continuously feeding ethylene. At the end of this time period the polymerization is interrupted by introducing into the reactor 20 ml of a 10 wt % solution of ionol in alcohol. 450 g of polymer are obtained with the following values:

Productivity: 2.6 kg of polyethylene per g of solid catalyst component;

Yield: 196 kg of polyethylene per g of titanium in the solid catalyst component.

The polymer produced has the following characteristics:

Melt index: ASTM-D 1238, 0.2 g/10 min
Shear sensitivity: ASTM-D 1238, 123
Ratio of weight-average molecular weight to number-average molecular weight Mw/Mn: 15
Density: ASTM-D 2839, 0.9525 g/ml
Physical form of polymer: runnable spherules with a mean diameter of $800\mu$
Apparent density: 0.28 g/ml
Fines content ($<150\mu$): 0.5 wt %
Fraction extractable with boiling n-heptane: 1.5 wt %.

EXAMPLE 6

The following are fed in the stated order into a 3-neck 500 ml flask fitted with a bladed stirrer, under nitrogen:
50 ml of anhydrous n-heptane
3.7 g of the described aerogel previously activated at 165° C. as indicated
34.6 g (0.18 moles) of pure $TiCl_4$.

The flask is maintained at a temperature of 120° C. for 3 hours. It is cooled and the solid washed with 8 aliquots of 50 cc of anhydrous n-heptane, each time heating to 85° C.

On analysis the solid provides the following data:
Ti: 5.29 wt %
Chlorine/titanium molar ratio: 2.6.

The solid is again suspended by stirring in 50 ml of n-heptane and is treated at ambient temperature with a 15 ml heptane solution containing 0.58 g (2.0 mmoles) of vanadium bis-mesitylene, with a Ti/V molar ratio of 2:1.

The mixture is kept stirred at ambient temperature for 180 minutes.

It is washed with anhydrous n-heptane and dried in a fluidized bed to obtain a highly runnable brown powder having the following characteristics:
particle shape and size similar to those of the initial aerogel
mean diameter 100μ
apparent density 0.41 g/cm$^3$
surface area 165 m$^2$/g
total pore volume 1.05 cc/g
titanium content 5 wt %.
The solid contains:
Ti = 5 wt %
V = 2.65 wt %
Chlorine = 11.7 wt %
Aerogel = 80.7 wt %
$Ti_2V_1Cl_6$.

EXAMPLE 7

Polymerization with catalyst of Example 6, aerogel/-$Ti_2.V_1$ 1820 ml of anhydrous n-heptane, 0.3 g of triethylaluminium and 50 mg of the solid catalyst component prepared as previously described in Example 6 are introduced in that order into a 5 liter reactor, under stirring.

The temperature in the reactor is raised to 90° C. and the reactor pressurized with hydrogen to 2 atm. Ethylene is fed to a pressure of 6.5 atm and this pressure is maintained during the following one hour by continuously feeding ethylene. At the end of this time period the polymerization is interrupted by introducing into the reactor 20 ml of a 10 wt % solution of ionol in alcohol. 287 g of polyethylene are obtained with the following values:
Productivity: 5.8 kg of polyethylene per g of solid catalyst component;
Yield: 115 kg of polyethylene per g of titanium in the solid catalyst component. The polymer produced has the following characteristics:
Melt index: ASTM-D 1238, 0.06 g/10 min
Shear sensitivity: ASTM-D 1238, 54
Ratio of weight-average molecular weight to number-average molecular weight Mw/Mn: 8
Density: ASTM-D 2839, 0.9550 g/ml
Physical form of polymer: runnable spherules with a mean diameter of 1000μ
Apparent density: 0.31 g/ml
Fines content (<150μ): 0.3 wt %
Fraction extractable with boiling n-heptane: 1 wt %.

EXAMPLE 8

Catalyst containing aerogel+Ti+Hf, without magnesium.

The following are fed in the stated order into a 3-neck 500 ml flask fitted with a bladed stirrer, under nitrogen:
5 g of previously described aerogel, activated as indicated
a solution in 50 ml of heptane containing 0.74 g (2.8 mmoles) of titanium dichloro dibutoxy [Ti-$(OC_4H_9)Cl_2$]and 1.10 g (2.8 mmoles) of hafnium dichloro dibutoxy [Hf$(OC_4H_9)Cl_2$]
Hf/Ti molar ratio = 1:1.

The mixture is kept stirring at 60° C. for 1 hour, analytically checking the metal compound adsorption onto the aerogel. The next step is commenced when the Ti+Hf content of the n-heptane is less than 10 mol % of the initial total value.

Chlorination with ethylaluminium sesquichloride is then commenced. 3.1 g (12.7 mmoles) are added to the flask dropwise at ambient temperature under stirring. Ratio of chlorine in the alkyl to OR groups = 3.4.

When the addition is complete the mixture is heated to 60° C. for 120 minutes. It is filtered and washed with 3 aliquots each of 50 cc of n-heptane.

After drying in a fluidized bed a solid is obtained with the following characteristics:
particle shape and size similar to those of the initial aerogel; mean diameter 100μ
apparent density 0.36 g/cm$^3$
surface area 155 m$^2$/g
total pore volume 0.8 cc/g
titanium content 1.79 wt %
$Ti^{+3}/Ti^{+4}$ ratio 0.93/1.
The solid contains:
Ti = 1.79 wt %
Hf = 6.78 wt %
Al = 3.4 wt %
Cl = 12.1 wt %
Organic part (OBu+Et) = 6.26 wt %
Aerogel = 66.67 wt %.
The molar formula can be expressed as
$Ti_1Hf_1Al_{3.4}Cl_{9.2}(OBu+Et)_{2.8}$.

EXAMPLE 9

Polymerization with catalyst prepared in Example 8.

1820 ml of anhydrous n-heptane, 0.68 g of triisobutylaluminium, 6 g of 1-butene and 261 mg of the solid catalyst component prepared as previously described are introduced in that order into a 5 liter reactor, under stirring.

The temperature in the reactor is raised to 85° C. and the reactor pressurized with hydrogen to 4.5 atm. Ethylene is fed to a pressure of 10 atm and this pressure is maintained during the following 4 hours by continuously feeding ethylene. At the end of this time period the polymerization is interrupted by introducing into the reactor 20 ml of a 10 wt % solution of ionol in alcohol. 227 g of polyethylene are obtained with the following values:
Productivity: 1.0 kg of polyethylene per g of solid catalyst component;
Yield: 65 kg of polyethylene per g of titanium in the solid catalyst component.

The polyethylene produced has the following characteristics:

Melt index: ASTM-D 1238, 0.2 g/10 min
Shear sensitivity: ASTM-D 1238, 85
Ratio of weight-average molecular weight to number-average molecular weight Mw/Mn: 9.5
Density: ASTM-D 2839, 0.9555 g/ml
Physical form of polymer: runnable spherules with a mean diameter of 800μ
Apparent density: 0.26 g/ml
Fines content (<150μ): 0.46 wt %
Fraction extractable with boiling n-heptane: 1.8 wt %.

We claim:

1. A supported catalyst active in the polymerization and copolymerization of olefinically unsaturated compounds, comprising an organometallic compound of aluminium and a component obtained by bringing a titanium, vanadium or chromium compound, at least one compound of a second metal chosen from V, Al, Zr, Hf, Mo and Nd and optionally a magnesium compound into contact with a porous support, characterised in that said porous support consists of microbeads of aerogels of one or more inorganic oxides, and having a surface area exceeding 300 $m^2/g$, a total pore volume exceeding 1 ml/mg and at least 90% of their pores having a diameter lying within a very narrow range of values, the difference between the maximum and minimum values of which is at most 50 Å, said diameter being between 50 and 1000 Å.

2. A supported catalyst as claimed in claim 1, characterised in that the aerogel consists of one or more oxides of metals chosen from Al, Si, Ti, B, La, Zr, Cr, Sn, Mg and Hf.

3. A supported catalyst as claimed in the preceding claim, characterised in that the aerogel is $SiO_2$.

4. A supported Ziegler-Natta catalyst as claimed in claim 1, characterised in that the aerogel consists of $SiO_2$ microbeads in which 95% of their pores have a diameter of between 100 and 150 Å.

* * * * *